3,327,603
AIR-CONDITIONING DEVICE FOR AUTOMOBILE VEHICLES
Gaëtan de Coye de Castelet, Billancourt, France, assignor to Regie Nationale des Usines Renault, Billancourt, France
Filed Nov. 30, 1964, Ser. No. 414,655
Claims priority, application France, Dec. 4, 1963, 956,082, Patent 1,387,157
1 Claim. (Cl. 98—2)

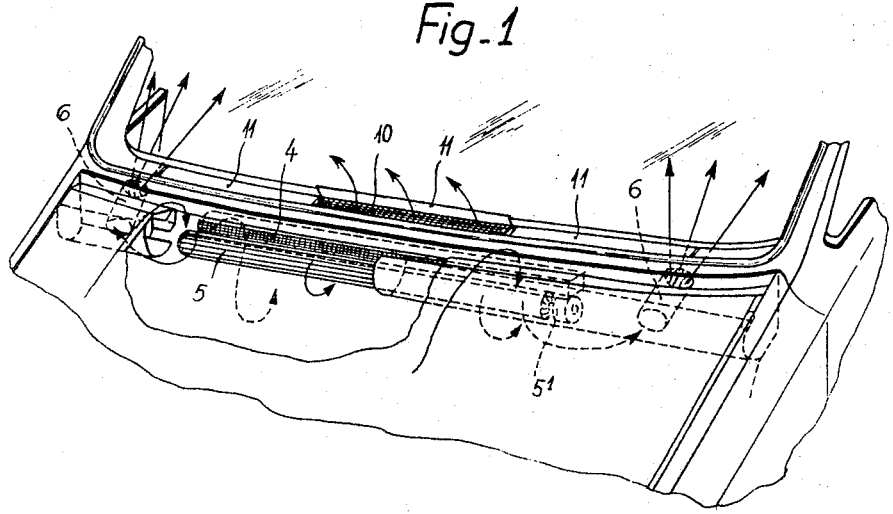
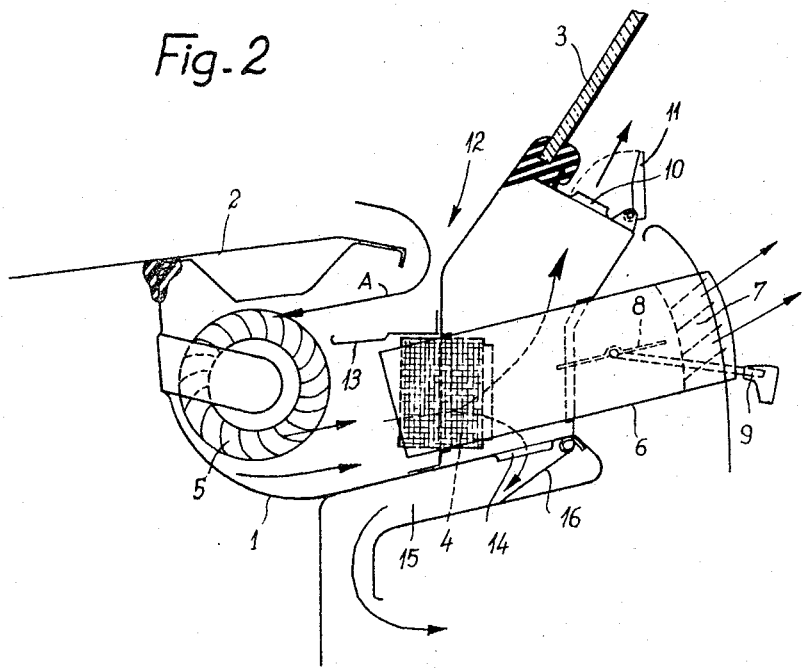

ABSTRACT OF THE DISCLOSURE

An air-conditioning device to be mounted within the hollow transverse girder below a vehicle's windshield including a radiator of considerable length, a fan of even greater length mounted immediately in front of and parallel to the radiator, an ambient air inlet to said fan and conditioned air outlets for distributing the conditioned air to the passenger compartment.

---

The present invention relates to the air-conditioning of automobile vehicles and is more particularly concerned with a device permitting the effectiveness of the air-conditioning to be improved and to distribute the conditioned air for the better comfort of the passengers, while employing parts of small overall size which are easy to assemble, these parts being arranged in a hollow transverse girder on the windscreen, as has already been disclosed in the applicant's Patent 3,208,368 filed June 19, 1963, and application No. 400,787 of Oct. 1, 1964, for "Air-Conditioning Device for Automobiles."

The improvements forming the object of the invention consist essentially in obtaining a total supply of air, not only through orifices along the edge of the base of the windscreen, but also through lateral ventilators by means of a fan of great length, disposed parallel or tangential to the radiator, which is itself of great length; the fan and the radiator, together with the accessory parts are mounted in the hollow girder.

In the accompanying drawings:

FIG. 1 is a partial diagrammatic view of the front of the vehicle showing the air-conditioning devices with the arrangement forming the object of the invention; and FIG. 2 shows to a larger scale a transverse section of the hollow girder, showing the detail of the air-conditioning devices.

Referring now to the drawings, it can be seen that the hollow girder connecting the two sides of the chassis-body is shown at 1, the bonnet of the engine at 2 and the windscreen at 3.

Inside the girder 1 is mounted the so-called "aerotherm" system or heating radiator 4 through which passes the cooling water of the engine and which extends transversely over a considerable length in the central portion of the girder. The fan 5, suitably supported by the beam 1, is also of considerable length, preferably even greater than that of the radiator, and is arranged parallel to this radiator. The fan 5 is driven by the electric motor $5^1$.

Also in the interior of the hollow girder 1 are mounted the side tubes 6 which deliver into the passenger space of the vehicle with a grid 7 for distributing the air and a closure valve device 8 operated by a lever 9. The girder 1 is provided directly below the windscreen in the interior of the car body, with orifices 10 for the de-misting air, which orifices may be covered by long movable shutters 11 operated by hand, of which the central shutter 11 is shown in the open position in FIG. 1.

The outer air passes into the interior of the hollow girder 1 through orifices 12, following the arrangement generally adopted, with a gutter 13 for evacuating water. The lower wall of the girder 1 is provided with orifices 14 which open into a tranverse conduit or passage 15 and receive the air intended for heating after having passed over the radiator 4. A shutter 16 operated by hand enables the communication to be interrupted between the girder and the conduit 15.

A cock permits the intake of hot water from the cooling system to the radiator 4 to be interrupted.

The operation of the whole air-conditioning system is as follows:

The air passing through the orifices in the scuttle window in the interior of the hollow girder 1, and for simply ventilating the car interior with fresh air, the intake of hot water to the radiator being closed, is driven by the fan 5 through the cooled radiator towards the de-misting orifices 10 if the latter are open, and towards the lateral ventilators 6, the shutters 8 of which are open. In order to send hot air into the passenger space, the radiator cock is open and the fan 5 is started up while at the same time one or more of the shutters 11, 12 are opened for de-misting, the shutters 8 of the side ventilators, and also the shutter 16 of the conduit 15. The path of the air is shown by the arrows.

What is claimed is:

An air-conditioning device for vehicles having a hollow transverse girder immediately beneath the windscreen comprising a heating radiator of considerable length disposed transversely to the vehicle to define within said hollow girder a forward fresh air compartment and a rearward conditioned air compartment, a fan of a greater length than said radiator and extending substantially across the entire width of said vehicle, said fan being mounted in said forward compartment parallel to said radiator, first orifice means for passing ambient air into said forward compartment, and second orifice means in said rear compartment for distributing the conditioned air to the passenger space.

References Cited

UNITED STATES PATENTS

| 2,796,820 | 6/1957 | Moore | 98—2.4 |
| 3,078,779 | 2/1963 | Wilfert | 98—2.4 |
| 3,105,431 | 10/1963 | Stratton | 98—2.4 |

FOREIGN PATENTS

| 1,339,569 | 9/1963 | France. |

MEYER PERLIN, *Primary Examiner.*